INVENTORS
Joseph Ladoniczki &
Klara Ladoniczki

BY Terrell C. Birch

ATTORNEY

INVENTORS
Joseph Ladoniczki &
Klara Ladoniczki

BY Terrell C. Birch

ATTORNEY ced # United States Patent Office 3,323,005
Patented May 30, 1967

3,323,005
FLUORESCENT LAMP CIRCUIT WHICH AUTO-MATICALLY SELECTS THE PROPER VOLTAGE SUPPLY
Joseph Ladoniczki and Klara Ladoniczki, Orange City, Fla., assignors to Trak Microwave Corporation, Tampa, Fla.
Filed Aug. 14, 1964, Ser. No. 390,274
9 Claims. (Cl. 315—86)

This invention relates to fluorescent lighting means and more particularly to fluorescent lamp units and circuits therefor which automatically adapt themselves to either alternating current or direct current power supplies at the instant of interconnection therewith.

It is an object of this invention to provide a new and novel energizing circuit for fluorescent lamps and the like.

Another object of this invention is to provide a new and novel energizing circuit for fluorescent lamps and the like which automatically adapts itself to be energized by either direct or alternating current.

Still another object of this invention is to provide a new and novel fluorescent lamp energizing circuit which has a single common input connection for either alternating or direct current energization.

Yet another object of this invention is to provide a new and novel fluorescent lamp energizing circuit and fluorescent lamp unit incorporating same which are simple and inexpensive to produce, in that the need for a separate ballast transformer is, and are foolproof in operation.

These and other objects of this invention will become more fully apparent with reference to the following specification and drawings which relate to several preferred embodiments of the invention.

Figure 1:
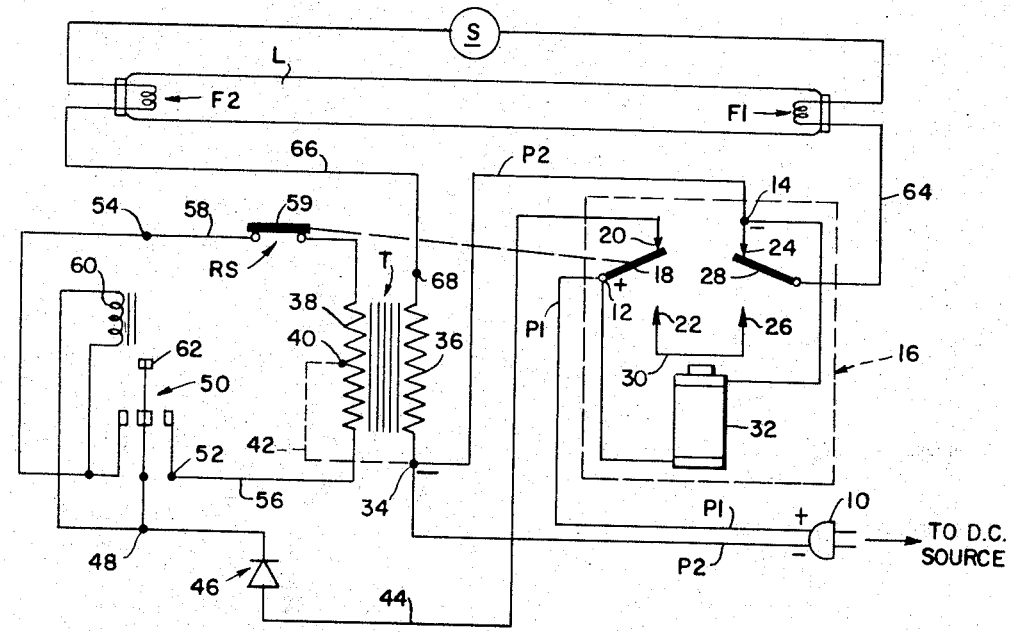
FIGURE 1 is a schematic of a first embodiment of the invention in a state of direct current energization.

Referring in detail to the drawings and more particularly to FIGURE 1, the first embodiment of the invention is shown as including a power plug 10 with first and second power leads P1 and P2, respectively, extending therefrom.

The power plug 10 is adapted to be connected with a direct current source (not shown) such as a six (6) or twelve (12) volt storage battery such that the first power lead P1 is of positive (+) polarity and the second power lead P2 is of negative (−) polarity.

The first and second power leads P1 and P2 are connected, respectively, with first and second relay terminals 12 and 14 of an alternating current relay 16.

The first relay terminal 12 is connected with a first armature contact 18 which moves between first and second fixed contacts 20 and 22.

The second relay terminal 14 is connected with a third fixed contact 24, the latter being located opposite a fourth fixed contact 26. A second armature contact 28 is positioned to move between the said third and fourth fixed contacts 24 and 26.

The second and fourth fixed contacts 22 and 26, respectively, are interconnected via a lead 30.

The first and second relay terminals 12 and 14, respectively, are interconnected through a relay winding 32.

The second relay terminal 14 is connected to a circuit junction 34, intermediate the ends of the second power lead P2, the said junction 34 comprising one end of a secondary winding 36 of a power transformer T.

The transformer T has a primary winding 36 including a center tap 40 which is connected via a lead 42 to the junction 34 and thus, to the second power lead P2.

The first fixed terminal 20 of the relay 16 is connected via a lead 44 and semiconductor diode 46 to the armature terminal 48 of a three terminal vibrator 50. The vibrator 50 includes first and second output terminals 52 and 54 which are connected to opposite sides of the primary 38 of the transformer T, via first and second transformer input leads 45 and 58, respectively.

The second input lead 58 includes an in-line switch RS including a bridging contact 59 which is mechanically coupled with the first armature contact 18 of the relay 16, such that when the said first armature contact 18 is in its normally closed position against the first fixed relay contact 20, the bridging contact 59 is positioned to close the in-line switch RS and effect a continuous circuit through the said second input lead 58.

As is well known in vibrator circuits, the vibrator 50 includes an energizing coil 60 and associated vibrator-armature 62, the latter being movable between a pair of fixed contacts and connected with the armature terminal 48.

The second armature contact 28 of the relay 16 is connected via a lead 64 in series with the other side of the secondary winding 36 of the transformer T through the filament circuit of a fluorescent lamp L, the said filament circuit comprising, in series, a first filament F1, a voltage-responsive starter S and a second filament F2. The second filament F2 is connected via a lead 66 to a terminal 68 at the said other side of the secondary 36.

Figure 2:
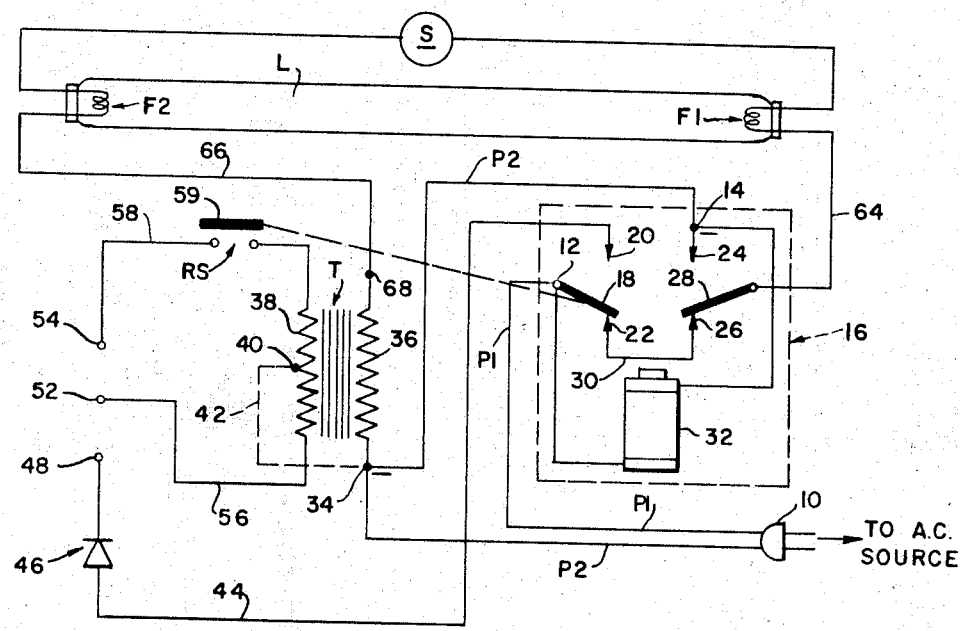
FIGURE 2 is a schematic of the embodiment of FIGURE 1 in a state position of alternating current energization.

Referring to FIGURE 2, the elements displayed therein are identical to those of FIGURE 1 and respectively bear like numerals. This figure will be hereinafter referred to in connection with the operation of the embodiment of FIGURES 1 and 2.

Figure 3:
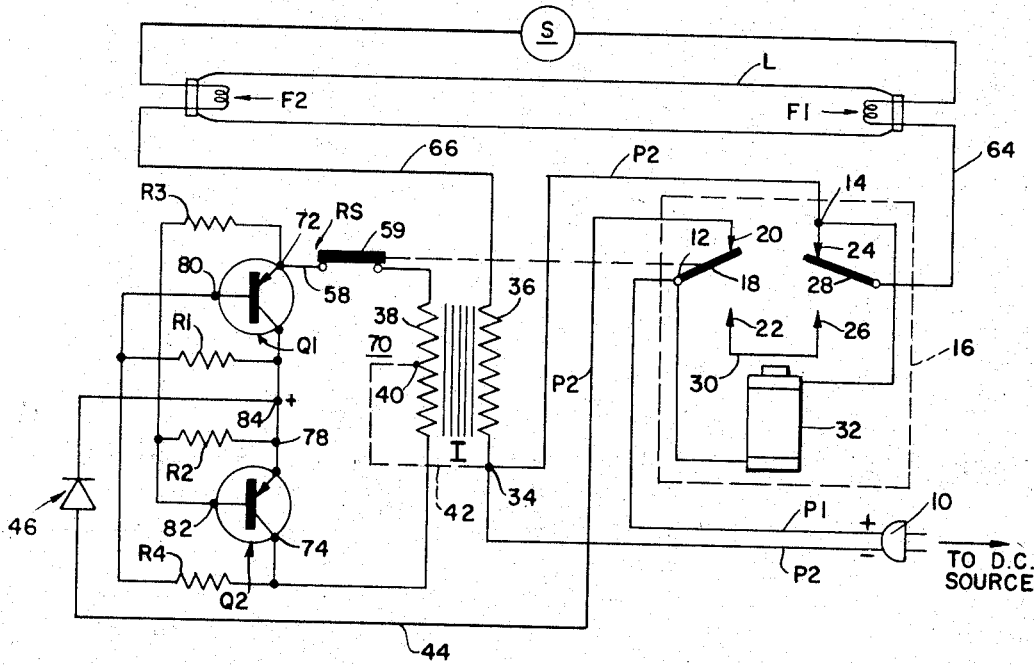
FIGURE 3 is a schematic of a second embodiment of the invention in a state of direct current energization.
Figure 4:
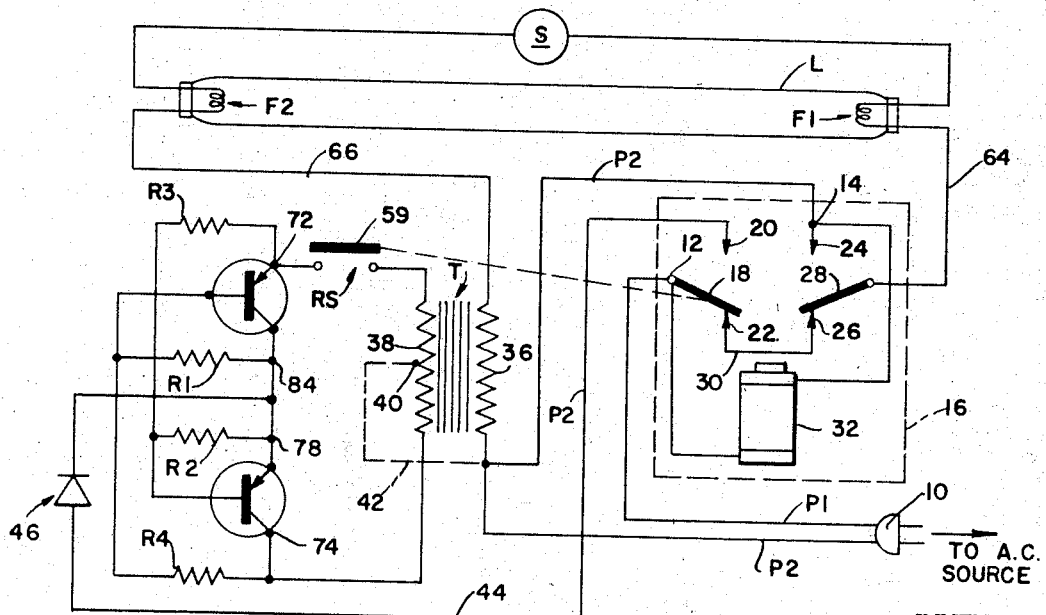
FIGURE 4 is a schematic of the embodiment of FIGURE 3 in a state of alternating current energization.

Referring to FIGURES 3 and 4, another embodiment of this invention will now be described, like elements to the embodiment of FIGURES 1 and 2 bearing like numerals.

The mechanical vibrator 50 of FIGURES 1 and 2 is replaced in FIGURES 3 and 4 with a transistorized power oscillator 70.

The power oscillator 70 includes first and second transistors Q1 and Q2 of like polarity, including, respectively, collector terminals 72 and 74, emitter terminals 76 and 78, and base terminals 80 and 82. The collector terminals 72 and 74 are connected, respectively, with the input leads 58 and 56 of the primary winding 38 of the transformer T. The emitter terminals 76 and 78 are joined together at a common node 84 which, in turn, is connected through the cathode-anode path of a semiconductor diode 86 and the lead 44 to the first fixed relay contact 20 of the relay 16.

The common node 84 is connected to the base terminal 80 of the first transistor Q1 via a first limiting resistor R1 and to the base terminal 82 of the second transistor Q2 via a second limiting resistor R2.

The collector terminal 72 of the first transistor Q1 is connected with the base terminal 82 of the second transistor Q2 via a first feedback resistor R3.

The collector terminal 74 of the second transistor Q2 is connected with the base terminal 80 of the first transistor Q1 via a second feedback resistor R4.

Thus, the power oscillator circuit 70 is completed.

Figure 5:
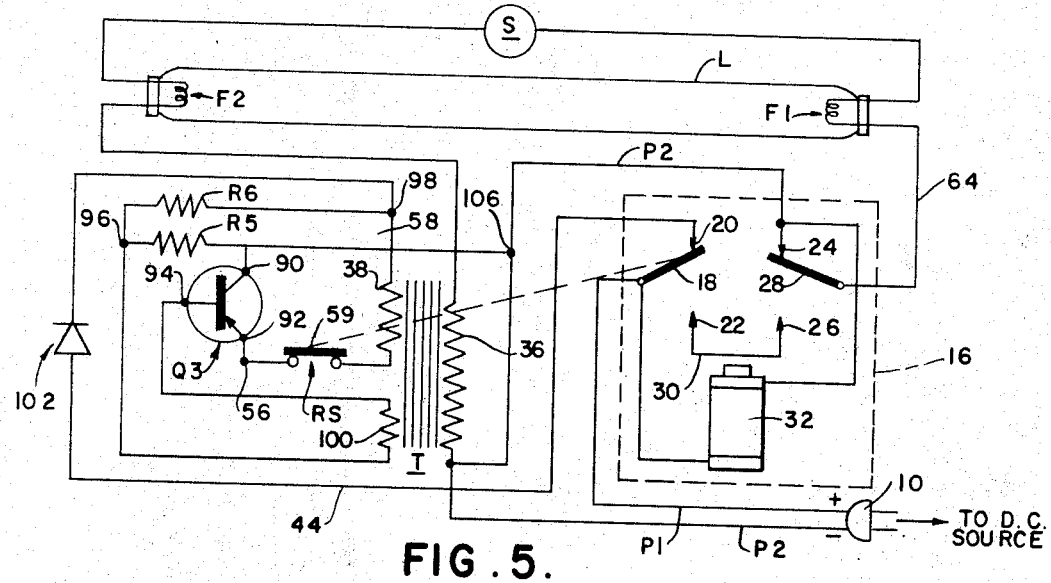
FIGURE 5 is a schematic of a third embodiment of the invention in a state of direct current energization.
Figure 6:
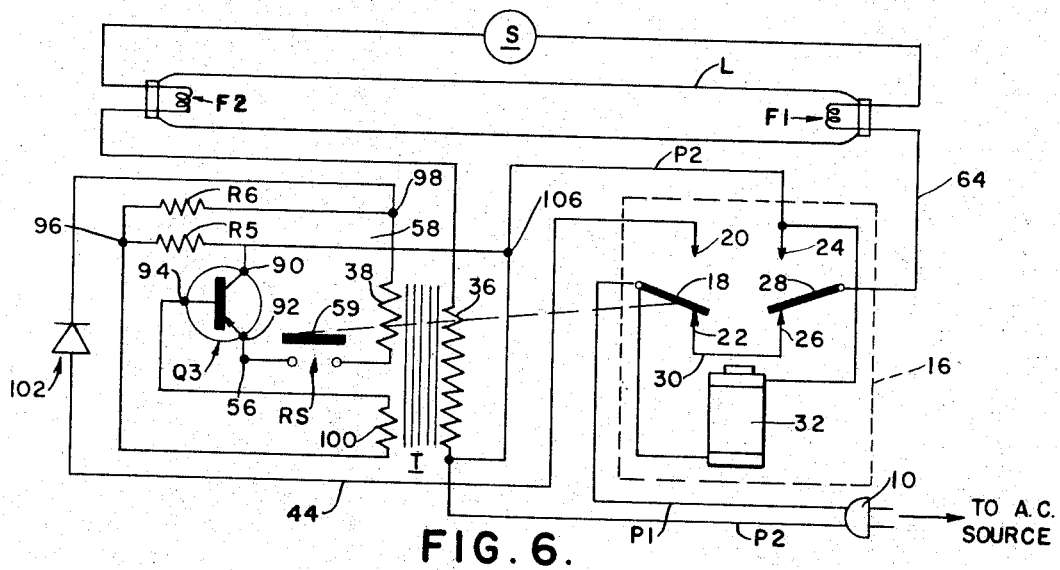
FIGURE 6 is a schematic of the embodiment of FIGURE 5 in a state of alternating current energization.

Referring to FIGURES 5 and 6, a third embodiment of the invention will now be described, like parts to the embodiments of FIGURES 1, 2, 3 and 4 bearing like numerals.

The power oscillator circuit 70 of FIGURES 3 and 4 is replaced in FIGURES 5 and 6 with another embodiment of a power oscillator circuit 88.

The power oscillator 88 includes a single transistor Q3 having collector, emitter and base terminals 90, 92 and 94, respectively.

The collector terminal 90 of the transistor Q3 is connected through a feedback resistor R5 to a first junction point 96, the latter being connected through a limiting resistor R6 to a second junction point 98. The second junction point 98 is connected to one side of the primary winding 38 of the transformer T by the second transformer input lead 58. The first transformer input lead 56, at the other side of the primary winding 38, is connected directly to the emitter terminal 92 of the transistor Q3 and in this embodiment, the said second input lead 56 includes the in-line switch RS previously described with respect to FIGURE 1.

The base terminal 94 of the transistor Q3 is connected with the first junction point 96 through a feedback winding 100 which is magnetically coupled with the magnetic circuit of the transformer T.

The power oscillator circuit 88 is completed by connecting the second junction point 98 therein, through the cathode-anode path of a semiconductor diode 102 and the lead 44, with the first fixed relay contact 20 in the relay 16; and connecting the collector terminal 90 of the transistor Q3 with the third fixed relay contact 24 via a lead 104, a third junction point 106 on the second power lead P2, the power lead P2 and junction point 14 at the said third fixed relay contact 24.

In order to obviate the need for a separate ballast or choke inductance in the fluorescent lamp circuit means of the present invention, a new and novel structure is provided for the transformer T such that it serves both as a voltage step-up or amplifying means as well as a ballast or choke.

Figures 7, 8:
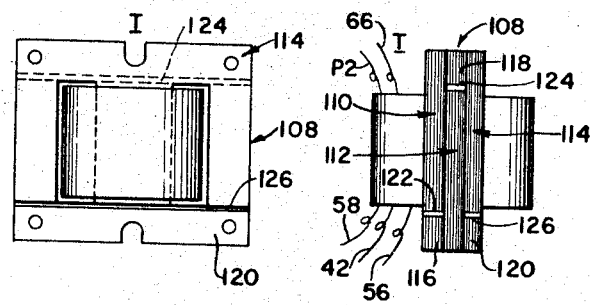
FIGURE 7 is a front plan view of a transformer used in all embodiments of the present invention.
FIGURE 8 is an end view of the transformer of FIGURE 7.

Referring to FIGURES 7 and 8, the transformer T is shown as including the windings of the embodiments of FIGURES 1, 2, 3 and 4 with the corresponding leads to these windings bearing like numerals.

The core structure 108 of the transformer T is comprised of first, second and third flat, laminated, E-shaped core groups 110, 112 and 114, respectively. Rectangular, bar-shaped, first, second and third magnetic shunts 116, 118 and 120 extend across the open portions of the said E-shaped core groups 110, 112 and 114, respectively.

The first and third core groups 110 and 114 are disposed in the same geometric attitude and comprise a sandwich containing and coextensively juxtaposed with the second core group 112 in which the E-shape is inverted with respect to the said first and third core groups 110 and 114.

The first, second and third magnetic shunts 116, 118 and 120 are separated from the E-shaped core groups 110, 112 and 114 to form first, second and third substantially identical gaps 122, 124 and 126, respectively, therebetween.

Because of the said outer and inner core groups in the above-described sandwich structure of the core 108, the first and third air gaps 122 and 126 are co-planar and coextensive but separated by the magnetic path comprising the closed side of the second E-shaped core group 112.

The second air gap 124 is parallel with the first and third air gaps 122 and 126 but is located at the opposite end of the core structure 108 and sandwiched between the magnetic path comprising the closed sides of the first and third E-shaped core groups 110 and 114.

In operation of the transformer T, when alternating current is either induced or directly applied to the secondary winding 36 thereof, the new and novel core structure defined above, because of the relative orientation of the first, second and third air gaps 122, 124 and 126 therein, results in a peaking of the voltage waveform produced therein of a sufficient amplitude to fire a fluorescent lamp connected thereacross by the connections described in connection with FIGURES 1 and 2 for the fluorescent lamp L.

*Operation*

With the operation of the transformer T having been previously described herein, the operation of the several embodiments of FIGURES 1, 2, 3, 4, 5 and 6 is as follows:

Referring first to FIGURES 1 and 2, the operation of this embodiment will now be described.

The relay 16 is adapted to be normally closed in the position shown in FIGURE 1, with the first and second armature contacts 18 and 28 thereof engaged, respectively, with the first and third fixed relay contacts 20 and 24 and with the coupled contact 59 in a position to close the in-line switch RS.

Assuming that a direct current voltage is applied to the power plug 10 of the polarity shown in FIGURE 1, i.e. positive (+) on the first power lead P1 and negative (−) on the second power lead P2, a connection is completed from the first power lead P1, junction 12, first armature contact 18, the first fixed relay contact 20, lead 44 and diode 46 to the first input terminal 48 of the vibrator 50. A circuit is thus completed from the first power lead P1 through the vibrator winding 60, second vibrator output terminal 54, second transformer input lead 58, in-line switch RS, primary winding 38, center tap 40 and lead 42 to the second power lead P2.

The vibrator 50 is thus energized, to vibrate the moving contact 62 thereof and generate alternating polarity current pulses, in a manner well-known in the art, which are applied to the primary winding 38, via the input leads 56 and 58 thereof.

The transformer action previously defined herein induces a peaked waveform of alternating current voltage in the secondary winding 36 of the transformer T. This voltage is connected across the filament circuit of the lamp L as previously defined in the detailed description of FIGURES 1 and 2, causing the voltage sensitive starter S to complete the filament circuit as soon as sufficient voltage has been induced in the said secondary winding 36 in response to the energization of the vibrator 50.

As soon as the starter S completes the filament circuit, the filaments are heated to incandescence by the current supplied thereto from the secondary winding 36. As is then well-known in the art, the peaked voltage waveform from the secondary winding 36, of the novel transformer structure of the present invention, causes the fluorescent lamp L to fire and thus the starter S is shorted out and the filament circuit opens. Thus, the lamp L is energized and will continue to be energized until power is removed from the power plug 10.

Should the power plug 10 be inadvertently connected with a direct current source in a polarity reverse to that shown in FIGURE 1, no energization of the lamp L will result and no damage will be incurred by the circuit components because of the blocking action of the semiconductor diode 46. Thus, if the power plug 10 is plugged-in to a battery source and no energization of the lamp L occurs, one has merely to reverse the polarity of the connection and the lamp L will be energized, no damage to the circuitry having been incurred in the meantime.

Assuming now that the power plug 10 is connected with an alternating current source, such as a 115 volt A.C. house current plug, this A.C. voltage is connected across the relay coil 32 via the first and second power leads P1 and P2 and the first and second relay terminals 12 and 14, respectively. This energizes the relay coil 32 and causes the first and second armature contacts 18 and 28 to break, respectively, with the first and third fixed relay contacts 20 and 24 and make, respectively, with the second and fourth fixed relay contacts 22, and 26. Simultaneously, the coupled contact 59 is actuated to open the in-line switch RS.

As a result, the lead 44 is disconnected from the first relay terminal 12 and first power lead P1, whereby the vibrator 50 is isolated from the power supply and rendered inoperative. Thus, no direct power input is provided to the primary winding 38 of the transformer T.

A.C. power is directly supplied to the secondary winding 36 via second power lead P2 and terminal 34 on one side thereof and via the first power lead P1, first relay terminal 12, first armature contact 17, second fixed contact 22, lead 30, fourth fixed contact 26, lead 64, first lamp filament F1, starter S, second lamp filament F2, lead 66 and terminal 68 on the other side thereof.

The above-described action of the voltage responsive starter S and the ballast or peaking effect of the secondary winding 36 of the transformer T cause the fluorescent lamp L to fire once the said secondary winding 36 has been energized.

The opening of the in-line switch RS further isolates the vibrator circuit 50 from the A.C. power input in that it prevents current flow into the vibrator as a result of voltage induced in the primary winding 38 from the direct energization of the secondary winding 36.

Referring now to FIGURES 3 and 4, the operation of the second embodiment of the invention is as follows:

First, in FIGURE 3, assuming a positive (+) polarity on the first power lead P1 and a negative (−) polarity on the second power lead P2, direct current energization at the power plug 10, the relay 16 is in the normally closed position shown, which results in a negative (−) polarity at the center tap 40 of the primary winding 38 as described above in regard to FIGURE 1.

A positive (+) polarity is provided at the first common circuit junction 84 of the power oscillator 70 via first relay terminal 20, lead 44 and the anode-cathode path of the diode 86.

The resistors R2 and R3 form a first voltage divider between the junction 84 and the center tap 40 of the primary 38 while the resistors R1 and R4 form a second voltage divider therebetween, placing a bias, respectively, on the bases 80 and 82 of the first and second transistors Q1 and Q2.

This biases both the said transistors to turn on and deliver opposing collector currents through the primary winding 38 to the center tap 40.

Because of the initial flux change in the primary 38 to an in-rush of collector current, the collectors 72 and 74 rise in potential, tending to vary the base bias of the bases 80 and 82 such that the transistors Q1 and Q2 will tend to cut off.

Because of this unstable equilibrium condition, one transistor will eventually overpower the other, causing in to cut off.

Assuming transistor Q1 overpowers transistor Q2, the current from collector 72 will increase against the inductive reactance of the primary 38 until a constant current flow has been achieved, thus lowering the potential at the collector 72.

This potential change is reflected at the base 82 of the second transistor Q2, causing it to turn on. As described in connection with the first transistor Q1, this results in a rise in potential of the collector 74 which is reflected at the base 80 of the first transistor Q1, causing it to cut off.

The two transistors are thus alternately cut on and off and an alternating current is injected into the primary winding 38, via the input leads 56 and 58 thereof, from the collector terminals 74 and 72, respectively.

If the polarity of the power leads P1 and P2 should be reversed, as by inverting the connection of the power plug 10 with the D.C. source to which it had been connected, no current of improper polarity would flow in the oscillator 70 due to the blocking action of diode 86. Thus, even should reverse polarity connections be made, no damage to the oscillator circuit will result.

The operation of the fluorescent lamp L and the relay 16 are identical with that already described in FIGURE 1, the lamp L being energized by induced voltage in the secondary winding 36.

Referring to FIGURE 4, if the power plug 10 is energized from an A.C. source, the relay 16 will assume the position shown as previously described with respect to FIGURE 2. This disconnects the lead 44 and the diode 86 from the first relay terminal 12 and precludes the delivery of power to the oscillator 70. Thus, as also described with respect to FIGURE 2, A.C. power is supplied directly to the circuit comprising the secondary winding 36 in series with the filament and starter circuit of the fluorescent lamp L.

Here again, the opening of the in-line switch RS by the coupled contact 59 prevents induced voltages in the primary winding 38 from deleteriously affecting the power oscillator circuit 70.

Referring now to FIGURES 5 and 6, the operation of the third embodiment of the invention is as follows:

Referring to FIGURE 5, the relay 16 is in the direct current or normally closed position previously described herein with respect to FIGURES 1 and 3.

With the polarities of the first and second power leads P1 and P2 positive (+) and negative (−), respectively, the junction point 98 in the power oscillator 88 is positive and the junction 106 and the collector terminal 90 of the transistor Q3 are at a negative potential.

The base terminal 94 is biased by the voltage divider comprising the resistors R6 and R5 in series between the junction 98 and the junction 106 such that the transistor Q3 is turned on upon application of D.C. power of the polarity shown, to the power plug 10.

When the transistor Q3 is turned on, current commences to flow through the primary winding 38 from the junction 98 to emitter terminal 92, via the in-line switch RS, and thence through the emitter-collector path out from the collector terminal 90 and lead 104 to the junction 106.

This current flow generates a flux change in the transformer T which is coupled to the feedback winding 100 in such a way as to cut off the transistor Q3 by an induced voltage opposing the bias at the base terminal 94 after a predetermined value of current has been achieved in the primary winding 38.

When the transistor Q3 cuts off, the magnetic field in the transformer T collapses and induces opposite polarity voltages in both the primary winding 38 and the feedback winding 100. Thus, alternating current is induced in the secondary winding 36 and the transformer Q3 is cycled on and off.

As in the previous embodiments, alternating current energization of the secondary winding 36 results in energization of the fluorescent lamp L.

Should the polarity of the power plug 10 be inadvertently inverted, the diode 102 will prevent any current flow between the junctions 98 and 106 and thus, no damage can be incurred due to a connection of the wrong polarity. Thus, all three embodiments of the invention shown and described herein cannot be harmed by way of connections of improper polarity at the power plug 10.

As in the previous embodiments, referring now to FIGURE 6, application of A.C. power to the power plug 10 energizes the relay 16 to the position shown and isolates the positive first power lead P1 from the power oscillator 88 at the first relay terminal 12 and the secondary winding 36 is directly energized with A.C. power. Further, the relay 16 causes the coupled contact 59 to open the in-line switch RS in the first transformer in-put lead 56, thereby preventing induced voltages in the primary 38 from deleteriously affecting the power oscillator 88.

As can be seen from the foregoing specification and drawings, this invention satisfies a long felt need in the art for a foolproof, self-selecting fluorescent lamp unit and circuit which automatically insures operation of proper polarity from a D.C. source, automatic selection of an alternate circuit for operation from an A.C. source, provides a novel transformer means whereby the need for a separate ballast element is obviated, and provides novel semiconductor and/or electromechanical power oscillator means as an integral part thereof.

It is to be understood that the several embodiments of the invention shown and described herein are for the purpose of example only and are not intended to limit the scope of the appended claims.

We claim:

1. Automatic self-selecting circuit means adapted to energize fluorescent lamp means from both A.C. and D.C. power supplies comprising a pair of input leads adapted to be connected with a power supply, voltage responsive switch means connected across said input leads, power oscillator means selectively interconnected with said input leads by said voltage responsive switch means in response to D.C. energization from the power supply and isolated from said input leads by said voltage responsive switch means in response to A.C. energization from the power supply, transformer means including primary and secondary windings, and fluorescent lamp means connected across said secondary winding, said voltage responsive switch means selectively interconnecting said power oscillator means and said input leads with said primary winding in response to D.C. energization from the power supply and selectively isolating said power oscillator means and said input leads and interconnecting said input leads with said secondary winding and said fluorescent lamp means in response to A.C. energization from the power supply.

2. The invention defined in claim 1, wherein said circuit means further includes polarity responsive means effecting energization of said power oscillator means in response to a preselected polarity of D.C. energization from the power supply and preventing energization of said power oscillator means in response to a polarity of D.C. energization inverse to said preselected polarity.

3. The invention defined in claim 1, wherein said transformer means further includes a laminated core structure encircling said windings comprising first, second and third E-shaped core sections, respectively, open on one side, said second core section being laminated with and sandwiched between said first and third core sections with the open side thereof inverted with respect to the open sides of the latter two core sections, magnetic shunt means spaced from and extending across the said open side of each of said first, second and third core sections providing first, second and third gaps, respectively, in said core sections, said first and third gaps being coplanar and spaced apart by said second core section and said second gap being parallel to said first and third gaps at the opposite side of said core structure therefrom and confined between said first and third core sections, said core structure effecting a peaking of the voltage waveform in said secondary winding during energization of said transformer means.

4. The invention defined in claim 3, wherein said circuit means further includes polarity responsive means effecting energization of said power oscillator means in response to a preselected polarity of D.C. energization from the power supply and preventing energization of said power oscillator means in response to a polarity of D.C. energization inverse to said preselected polarity.

5. The invention defined in claim 1, wherein said primary winding includes a center cap connected with said power input means; wherein said power oscillator means comprises electromechanical vibrator means having an input terminal and first and second output terminals, said output terminals being respectively connected to opposite sides of said primary winding, and polarity responsive means interconnecting said input terminal and one of said input leads; and further wherein said voltage responsive switch means includes circuit breaker means intermediate one of said output terminals and said primary winding selectively disconnecting said one of said terminals from said primary winding in response to A.C. energization from the power supply, whereby said vibrator means is selectively isolated from the power supply.

6. The invention defined in claim 1, wherein said power oscillator means comprises transistor means including emitter, collector and base terminals, said collector terminal being connected to one of said input leads, first and second series connected resistor means having a first junction therebetween connected at one end to a second junction common to the other of said input leads and one side of said primary winding, said emitter terminal being connected to the other side of said primary winding, and a feedback winding magnetically coupled with said transformer means connected on one side to said base terminal and on the other side to said first junction.

7. The invention defined in claim 1, wherein said power oscillator means comprises transistor means including emitter, collector and base terminals, said collector terminal being connected to one of said input leads, first and second series connected resistor means having a first junction therebetween connected at one end to a second junction common to the other of said input leads and one side of said primary winding, said emitter terminal being connected to the other side of said primary winding, and a feedback winding magnetically coupled with said transformer means connected on one side to said base terminal and on the other side to said first junction; wherein said power oscillator means further includes polarity responsive means interconnecting said second junction with said other input lead; and wherein said voltage responsive switch means includes circuit breaker means intermediate said emitter terminal and said other side of said primary winding selectively disconnecting said emitter terminal from said primary winding in response to A.C. energization from the power supply, whereby said power oscillator means is selectively isolated from the power supply.

8. The invention defined in claim 1, wherein said primary winding includes a center tap connected with one of said input leads; and wherein said power oscillator means comprises first transistor means having first emitter, first collector and first base terminals, second transistor means having second emitter, second collector and second base terminals, said first and second collector terminals being connected, respectively, to opposite sides of said primary winding, a junction common to said first and second emitter terminals connected with the other of said input leads, first and second resistors in series, respectively, between said junction and said first and second base terminals, and third and fourth resistors, respectively, interconnecting said first and second collector terminals with said second and first base terminals.

9. The invention defined in claim 1, wherein said primary winding includes a center tap connected to one of said input leads; and wherein said power oscillator means comprises first transistor means having first emitter, first collector and first base terminals, second transistor means having second emitter, second collector and second base terminals, said first and second collector terminals being connected, respectively, to opposite sides of said primary winding, a junction common to said first and second emitter terminals connected with the other of said input leads, first and second resistors in series, respectively, between said junction and said first and second base terminals, and third and fourth resistors, respectively, interconnecting said first and second collector terminals with said second and first base terminals; wherein said power oscillator means further includes polarity responsive means interconnecting said junction with said other input lead; and wherein said voltage responsive switch means includes circuit breaker means intermediate one of said collector terminals and said primary winding selectively disconnecting said one of said collector terminals from said primary winding in response to A.C. energization from the power supply, whereby said power oscillator means is selectively isolated from the power supply.

References Cited
UNITED STATES PATENTS

| | | | |
|---|---|---|---|
| 2,664,541 | 12/1953 | Henderson | 336—155 X |
| 2,703,376 | 3/1955 | Board | 315—219 |
| 2,868,996 | 1/1959 | McCord | 307—64 |
| 2,982,881 | 5/1961 | Reich | 315—205 |
| 3,019,782 | 2/1962 | Kuritza | 315—209 |
| 3,029,362 | 4/1962 | Roberts | 315—86 |
| 3,235,790 | 2/1966 | Collins | 307—88.5 |

JAMES W. LAWRENCE, *Primary Examiner.*

C. R. CAMPBELL, *Assistant Examiner.*